United States Patent
Goff et al.

(10) Patent No.: US 10,427,651 B2
(45) Date of Patent: Oct. 1, 2019

(54) UNDERCARRIAGE SPRAYER

(71) Applicants: Steven Goff, Merritt Island, FL (US); Todd Martens, Boca Raton, FL (US)

(72) Inventors: Steven Goff, Merritt Island, FL (US); Todd Martens, Boca Raton, FL (US)

(*) Notice: Subject to any disclaimer, the term of this patent is extended or adjusted under 35 U.S.C. 154(b) by 0 days.

(21) Appl. No.: 15/730,330

(22) Filed: Oct. 11, 2017

(65) Prior Publication Data

US 2018/0099647 A1 Apr. 12, 2018

Related U.S. Application Data

(60) Provisional application No. 62/406,631, filed on Oct. 11, 2016.

(51) Int. Cl.
| | |
|---|---|
| *B60S 3/04* | (2006.01) |
| *B05B 1/20* | (2006.01) |
| *B05B 15/16* | (2018.01) |
| *B05B 12/16* | (2018.01) |

(52) U.S. Cl.
CPC .................. *B60S 3/04* (2013.01); *B05B 1/20* (2013.01); *B05B 12/16* (2018.02); *B05B 15/16* (2018.02)

(58) Field of Classification Search
CPC .... B60S 3/00; B60S 3/04; B60S 3/041; B60S 3/042; B05B 1/20; B05B 1/202; B05B 1/205; B05B 1/207; B05B 12/16; B05B 15/16
See application file for complete search history.

(56) References Cited

U.S. PATENT DOCUMENTS

| | | | | |
|---|---|---|---|---|
| 2,070,665 | A | * 2/1937 | Lepper ................. | B05B 15/625 239/279 |
| 2,166,516 | A | * 7/1939 | Allen .................... | A62C 33/06 104/275 |
| 6,174,103 | B1 | * 1/2001 | Stroman .............. | E01F 15/086 404/15 |
| 6,651,901 | B2 | * 11/2003 | Jones ................... | B05B 1/3026 239/99 |
| 6,948,566 | B2 | * 9/2005 | Sundholm ........... | A62C 31/005 169/37 |
| 2016/0311409 | A1 | * 10/2016 | Schutz ................. | A61L 2/22 |

FOREIGN PATENT DOCUMENTS

KR 101173263 B1 * 8/2012

* cited by examiner

*Primary Examiner* — Darren W Gorman
(74) *Attorney, Agent, or Firm* — Nixon & Vanderhye P.C.

(57) ABSTRACT

An undercarriage sprayer includes a plurality of nozzle blocks aligned side-by-side, where each of the nozzle blocks includes a lateral channel therethrough and an upward-facing nozzle cap. A conduit extends between each of the lateral channels in fluid communication with each of the nozzle caps. The nozzle blocks prevent the water supply from being crushed when driving a vehicle over the undercarriage sprayer. Additionally, the nozzle blocks may be connected such that the undercarriage sprayer can be folded or rolled on itself.

16 Claims, 4 Drawing Sheets

UNDERCARRIAGE SPRAYER

CROSS-REFERENCES TO RELATED APPLICATIONS

This application claims the benefit of U.S. Provisional Patent Application No. 62/406,631, filed Oct. 11, 2016, the entire content of which is herein incorporated by reference.

STATEMENT REGARDING FEDERALLY SPONSORED RESEARCH OR DEVELOPMENT (NOT APPLICABLE)

BACKGROUND

The invention relates to a vehicle undercarriage sprayer and, more particularly, to an undercarriage sprayer that is portable while also protecting the water supply from being cut off or crushed during use.

A vehicle undercarriage sprayer is used to remove dirt, debris, salt and other corrosive materials from an underside of a vehicle. Existing sprayers generally form a permanent part of a static carwash. It may be desirable, however, to flush the vehicle undercarriage more often than a full carwash is needed. Additionally, repeated visits to a static carwash can be expensive.

Home versions of undercarriage sprayers do not suitably protect the water source and may be crushed or otherwise affect water pressure when driven over by a vehicle.

BRIEF SUMMARY

The undercarriage sprayer according to the described embodiments overcomes the drawbacks with existing constructions. The undercarriage sprayer may be configured such that it is easily rolled up for storage and portability. Additionally, the water supply and nozzle sprayers are protected and can be driven over by a vehicle without losing water pressure or damaging the device. Furthermore, the device can be assembled from modular sections and allows for the sprayer nozzles to be turned ON or OFF, thereby making the device customizable for any size vehicle or trailer.

In an exemplary embodiment, an undercarriage sprayer includes a plurality of nozzle blocks aligned side-by-side, where each of the nozzle blocks includes a lateral channel therethrough and an upward-facing nozzle cap, and a conduit extending between each of the lateral channels in fluid communication with each of the nozzle caps. The undercarriage sprayer may further include a flexible connector extending through the nozzle blocks and connecting the nozzle blocks to one another. Spacers may be positioned over the flexible connector between each of the nozzle blocks. Each of the nozzle blocks may include a forward ramp surface and an aft ramp surface. A first end nozzle block of the plurality of nozzle blocks may be provided with a hose connector in fluid communication with its respective lateral channel, and a second end nozzle block of the plurality of nozzle blocks may be provided with a hose cap that caps its respective lateral channel. The nozzle caps may be selectively displaceable between an ON position and an OFF position. In some embodiments, a distance between each of the nozzle blocks may be less than eight inches. The nozzle blocks may be spaced from one another such that the undercarriage sprayer can be folded or rolled on itself.

In another exemplary embodiment, an undercarriage sprayer includes a plurality of nozzle blocks aligned side-by-side, where each of the nozzle blocks includes a lateral channel therethrough and an upward-facing nozzle cap; a flexible connector extending between and through each of the plurality of nozzle blocks; and a conduit extending between each of the lateral channels in fluid communication with each of the nozzle caps. Each of the nozzle blocks may include a central section through which the lateral channels are formed and in which the nozzle caps are disposed. In this context, the nozzle blocks may further include a forward ramp surface and an aft ramp surface on opposite sides of the central section. The central section may be sized to protect the lateral channels, the nozzle caps and the conduit from being crushed. In some embodiments, the nozzle caps may be flush with or below a top surface of the central section.

BRIEF DESCRIPTION OF THE DRAWINGS

These and other aspects and advantages will be described in detail with reference to the accompanying drawings, in which.

DETAILED DESCRIPTION

Figure 1:
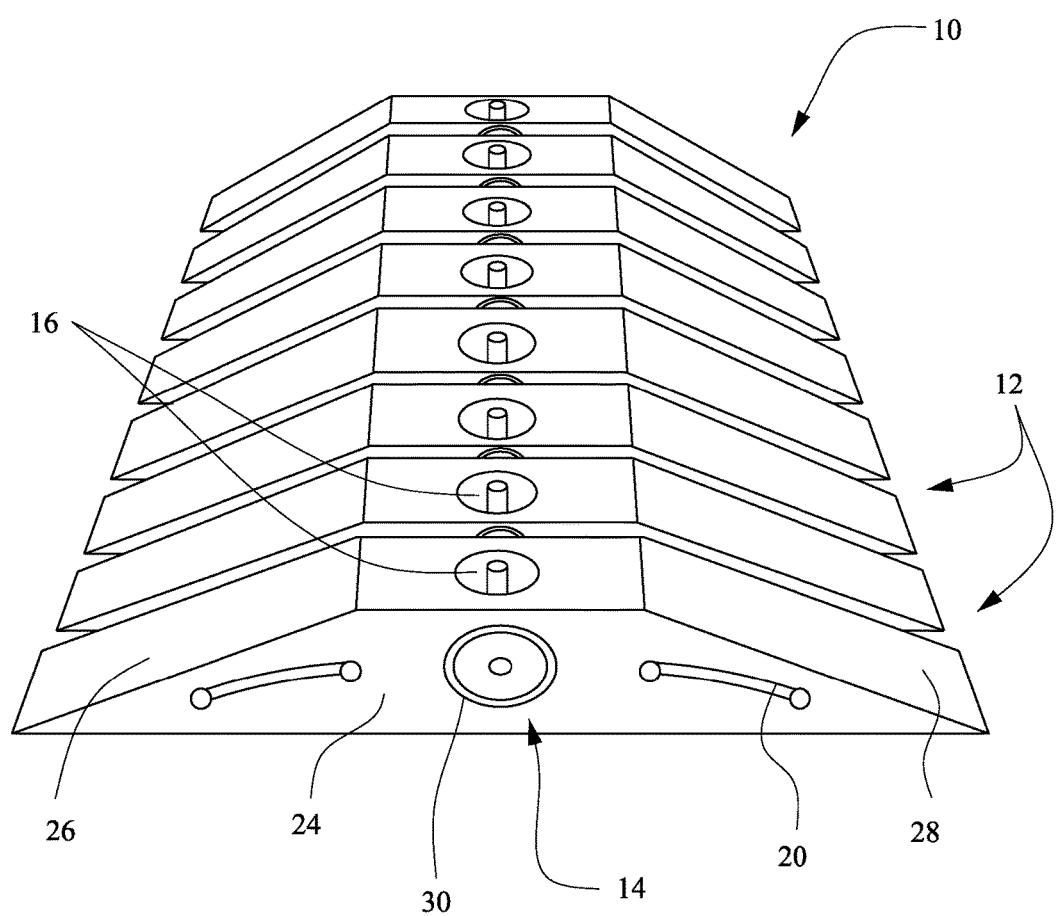
FIG. 1 is a perspective view of the undercarriage sprayer according to an exemplary embodiment.
Figure 2:
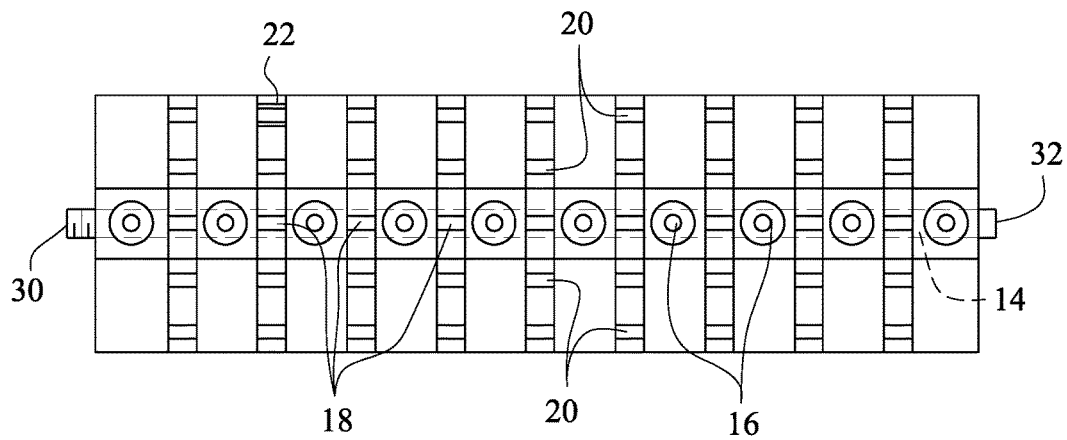
FIG. 2 is a plan view of the undercarriage sprayer.
Figure 3:
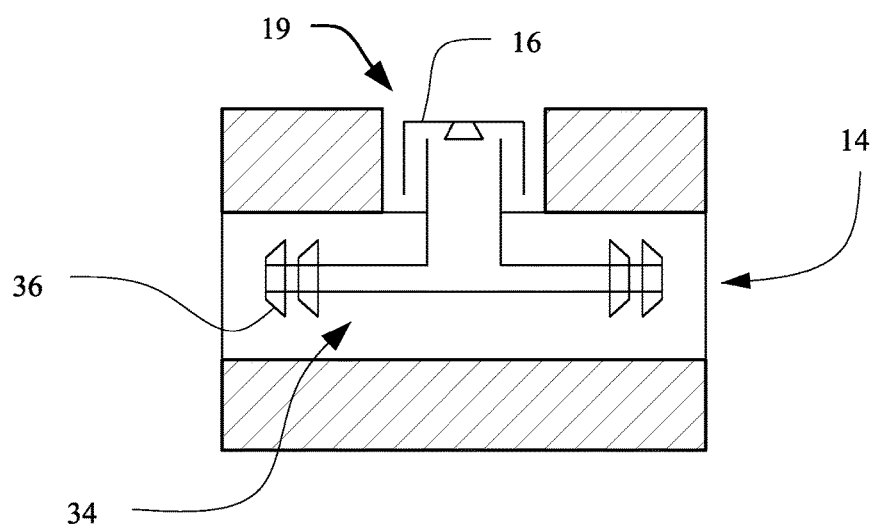
FIG. 3 is a cross-sectional view of one of the nozzle blocks.

With reference to FIGS. 1-3, an undercarriage sprayer 10 includes a plurality of nozzle blocks 12 aligned side-by-side to a desired width. The number of nozzle blocks 12 is selectable and may be sized to span a width of a standard vehicle or trailer. Any number of nozzle blocks 12 may be used to accommodate greater or narrower widths or multiple vehicles, etc. Each of the nozzle blocks includes a lateral channel 14 therethrough and an upward facing nozzle cap 16. A conduit 18 such as plastic tubing or the like extends between each of the lateral channels 14 in fluid communication with each of the nozzle caps 16.

Figure 4:
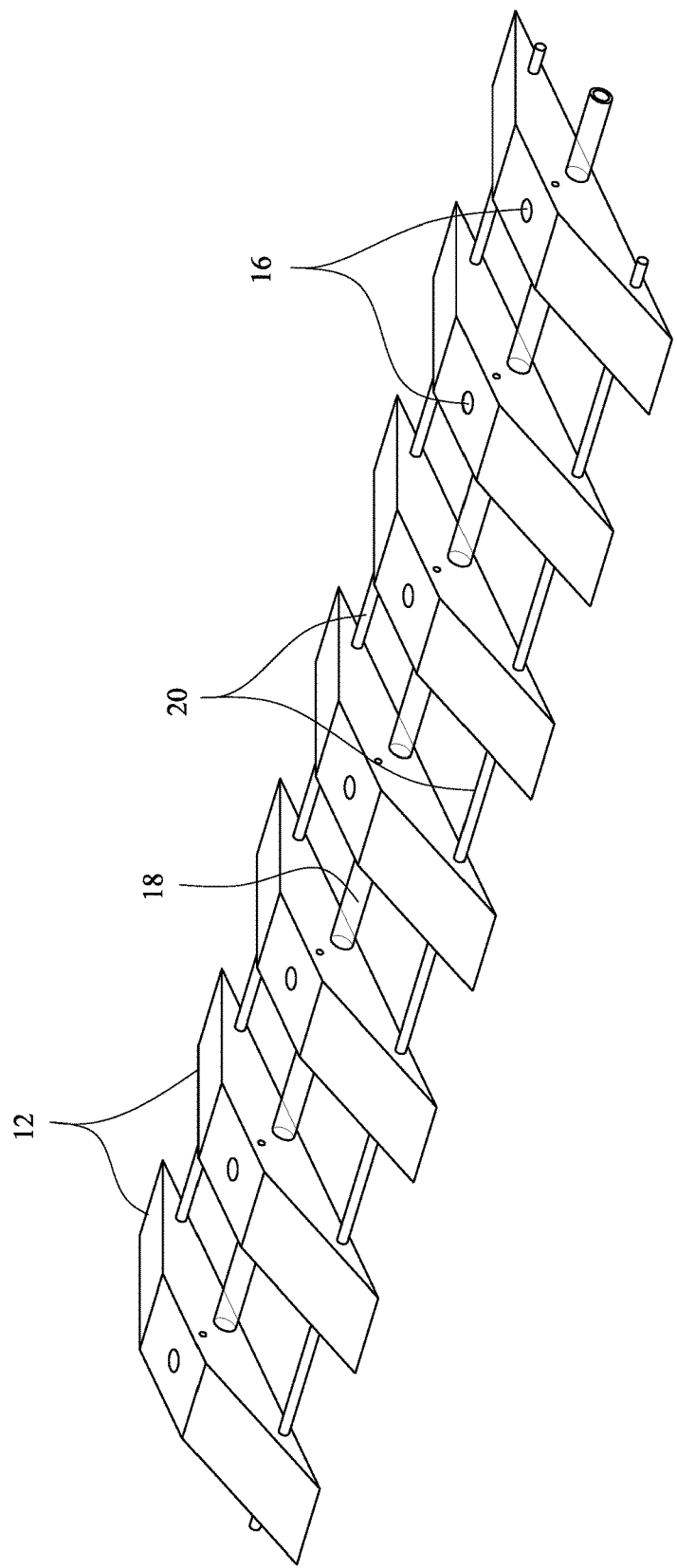
FIG. 4 shows an alternative configuration of the undercarriage sprayer.
Figure 5:
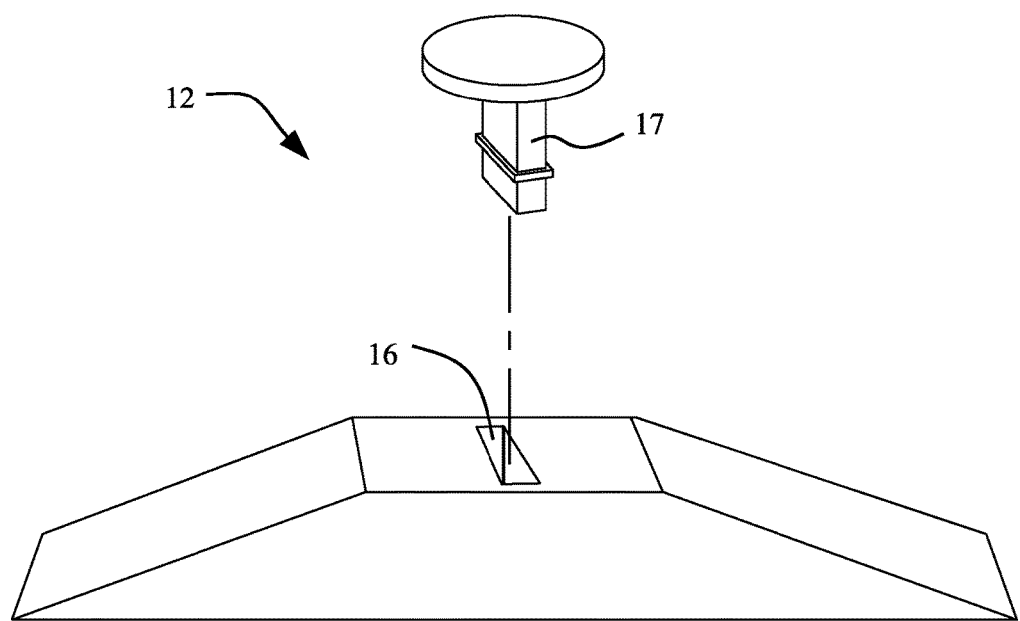
FIGS. 5 and 6 show exemplary nozzle plugs for selectively closing off one or more of the nozzle blocks.
Figure 6:
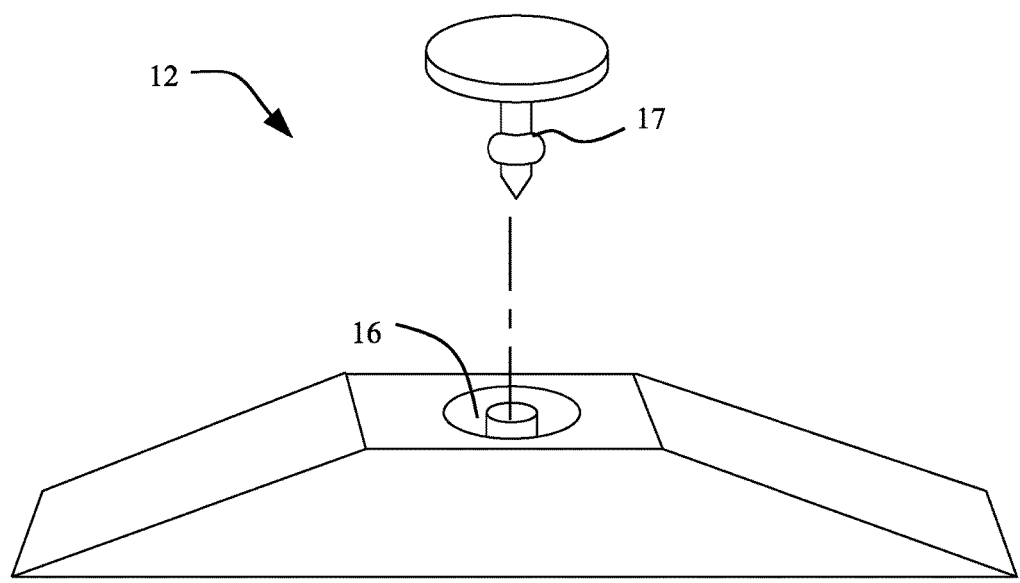

The nozzle caps 16 may be disposed in corresponding upward-facing openings 19 in the nozzle blocks 12. As shown in FIG. 3 for example, the nozzle caps 16 may be flush with or below a top surface of the nozzle block 12. The nozzle caps 16 may be secured by a snap engagement or the like or alternatively may be integrated into the nozzle blocks 12 during assembly. An exemplary embodiment showing the integrated nozzle caps 16 is shown in FIG. 4. The nozzle caps 16 in some embodiments may be displaceable, e.g., by rotating with a screwdriver or the like, between ON and OFF positions. Alternatively, the sprayer may be provided with a plurality of plugs 17 (FIGS. 5 and 6) or the like that can be selectively engaged with the nozzle caps 16 to stop the flow of water from that individual nozzle block. The plugs 17 can subsequently be removed as desired with a screwdriver or the like.

A flexible connector 20 may extend through the nozzle blocks 12 to connect the nozzle blocks 12 to one another. In the embodiment shown in FIGS. 1 and 2, the flexible connector 20 on each side of the conduit 18 is threaded through a first set of aligned holes formed in the nozzle blocks 12 and threaded back through a second set of aligned holes formed in the nozzle blocks 12. Alternatively, as shown in FIG. 4, the flexible connector 20 may connect the nozzle blocks in a single pass on either side of the conduit 18. In some embodiments, spacers 22 such as plastic sleeves or the like may be positioned over the flexible connector 20 between each of the nozzle blocks 12. The use of the flexible connector 20 and spacers 22 creates strong structural integrity yet makes the entire sprayer flexible and able to be rolled up for storage.

The nozzle blocks 12 may each include a central section 24 through which the lateral channels 14 are formed and in which the nozzle caps 16 are disposed. The nozzle blocks 12 may also include a forward ramp surface 26 and an aft ramp surface 28 on opposite sides of the central section 24. In some embodiments, the nozzle blocks 12 may be 10-12 inches in length by 2-3 inches in width, with the central section 24 being 1-2 inches in height. The sloped surfaces 26, 28 on opposite sides of the central section 24 allow a vehicle or the like to easily roll over the blocks 12 in either direction. The central section 24 is sized to protect the lateral channels 14, the nozzle caps 16 and the conduit 18 from being crushed during use.

A distance between the nozzle blocks 12 should be less than the width of a standard tire, i.e., 8 inches. It is desirable to place the nozzle blocks 12 much closer together, however (e.g., approx. 1-4 inches apart), to maximize the spray coverage of the sprayer in use. For example, the nozzle blocks 12 should be spaced far enough such that the undercarriage sprayer can be folded or rolled on itself but close enough so that the sprayer can effectively cover the area of the vehicle driving over the undercarriage sprayer.

A first end nozzle block may be provided with a hose connector 30 or the like in fluid communication with its respective lateral channel 14. A garden hose or other suitable water supply is attachable to the hose connector 30 to provide water to the sprayer. A second end nozzle block may be provided with a hose cap 32 that caps its respective lateral channel 14.

FIG. 3 is a cross-sectional view through a lateral channel 14 in one of the nozzle blocks 12. Each lateral channel may include a suitable T-shaped pipe 34 with connectors 36 for securing ends of the conduit 18. The pipe 34 delivers water through the channel 14 and upward to a respective nozzle cap 16 positioned over an upward facing opening of the pipe 34.

In use, the undercarriage sprayer 10 may be rolled out perpendicular to the driving direction of the vehicle or trailer to be sprayed. A garden hose or the like is connected to the hose connector 30 to supply water to the sprayer. The water travels into the water chamber of the first nozzle block 12 and sprays out through the nozzle cap 16 while continuing to adjacent and subsequent nozzle blocks 12. If the nozzle cap 16 is displaced to its OFF position (or if it is closed OFF with a nozzle plug 17), the vertical portion of the pipe 34 is closed by the nozzle cap 16 or plug 17, and water flows through to the next nozzle block 12. The number of sprayers to be opened up is up to the user in order to achieve the desired effect on their size vehicle or trailer. The user then drives their vehicle slowly over the sprayer 10 in either direction and as many times as desired. Upon completion, the water supply can be disconnected, and the undercarriage sprayer 10 may be rolled up for storage or transport.

The sprayer may be assembled from modular lengths to facilitate achieving a desired final assembly width. That is, the sprayer may come in the form of multiple standard sections that are selectively connectable together. For example, a standard module section may be 3-4 feet in width, and if the user desires a 6-8 foot sprayer, two of the modular units can be connected to each other. Still additional modular units may be added to accommodate wider or multiple vehicles.

The undercarriage sprayer of the described embodiments is effective to remove dirt and debris from the underside of a vehicle while also protecting the water source and being portable for easy storage or transport. The sprayer is easily configured to accommodate various width vehicles or multiple vehicles.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An undercarriage sprayer comprising:
   a plurality of nozzle blocks aligned side-by-side, each of the nozzle blocks including a lateral channel therethrough and an upward-facing nozzle cap, each of the nozzle blocks including a discrete opening for each of the nozzle caps, respectively, wherein each of the nozzle blocks includes a central section through which the lateral channel is formed and in which the nozzle cap and the discrete opening is disposed, and wherein in use as an undercarriage sprayer, each of the nozzle caps is flush with or below a top surface of the central section; and
   a conduit extending between each of the lateral channels in fluid communication with each of the nozzle caps, wherein the nozzle blocks are spaced from one another such that the undercarriage sprayer can be folded or rolled on itself.

2. An undercarriage sprayer according to claim 1, further comprising a flexible connector extending through the nozzle blocks and connecting the nozzle blocks to one another.

3. An undercarriage sprayer according to claim 2, further comprising spacers positioned over the flexible connector between each of the nozzle blocks.

4. An undercarriage sprayer according to claim 1, wherein each of the nozzle blocks includes a forward ramp surface and an aft ramp surface.

5. An undercarriage sprayer according to claim 1, wherein a first end nozzle block of the plurality of nozzle blocks comprises a hose connector in fluid communication with its respective lateral channel.

6. An undercarriage sprayer according to claim 5, wherein a second end nozzle block of the plurality of nozzle blocks comprises a hose cap that caps its respective lateral channel.

7. An undercarriage sprayer according to claim 1, wherein the nozzle caps are selectively displaceable between an ON position and an OFF position.

8. An undercarriage sprayer according to claim 1, wherein each of the nozzle blocks includes a forward ramp surface and an aft ramp surface on opposite sides of the central section including the top surface, the forward ramp surface, the aft ramp surface and the top surface defining a vehicle rollover surface, the undercarriage sprayer further comprising a plurality of nozzle plugs that are selectively engageable with the nozzle caps through the discrete openings in the top surface of the central section to close the nozzle caps.

9. An undercarriage sprayer according to claim 2, wherein a distance between each of the nozzle blocks is less than eight inches.

10. An undercarriage sprayer comprising:

a plurality of nozzle blocks aligned side-by-side, each of the nozzle blocks including a lateral channel therethrough and an upward-facing nozzle cap, each of the nozzle blocks including a discrete opening for each of the nozzle caps, respectively;

a flexible connector extending between and through each of the plurality of nozzle blocks; and a conduit extending between each of the lateral channels in fluid communication with each of the nozzle caps, wherein each of the nozzle blocks includes a central section through which the lateral channel is formed and in which the nozzle cap is disposed, wherein in use as an undercarriage sprayer, each of the nozzle caps is flush with or below a top surface of the central section, wherein each of the nozzle blocks includes a forward ramp surface and an aft ramp surface on opposite sides of the central section, the forward ramp surface, the aft ramp surface and the top surface defining a vehicle rollover surface, and wherein each of the nozzle caps is configured to output fluid from the conduit through the discrete openings in the top surface of the central section, respectively.

11. An undercarriage sprayer according to claim 10, wherein the central section is sized to protect the lateral channels, the nozzle caps and the conduit from being crushed.

12. An undercarriage sprayer according to claim 10, wherein the nozzle caps are selectively displaceable between an ON position and an OFF position.

13. An undercarriage sprayer according to claim 10, wherein the nozzle blocks are spaced from one another such that the undercarriage sprayer can be folded or rolled on itself.

14. An undercarriage sprayer comprising:

a plurality of nozzle blocks aligned side-by-side, each of the nozzle blocks including a lateral channel therethrough, an upward-facing nozzle cap, first and second connector channels therethrough parallel to and spaced from the lateral channel on one side of the lateral channel, and third and fourth connector channels therethrough parallel to and spaced from the lateral channel on an opposite side of the lateral channel;

a first flexible connector extending between and through each of the plurality of nozzle blocks via the first and second connector channels, the first flexible connector extending through the first connector channels of the aligned nozzle blocks and through the second connector channels of the aligned nozzle blocks;

a second flexible connector extending between and through each of the plurality of nozzle blocks via the third and fourth connector channels, the second flexible connector extending through the third connector channels of the aligned nozzle blocks and through the fourth connector channels of the aligned nozzle blocks; and a conduit extending between each of the lateral channels in fluid communication with each of the nozzle caps.

15. An undercarriage sprayer according to claim 14, further comprising spacers positioned over the flexible connector between each of the nozzle blocks.

16. An undercarriage sprayer according to claim 1, wherein the nozzle blocks are 2-3 inches in width.

* * * * *